Patented Dec. 2, 1924.

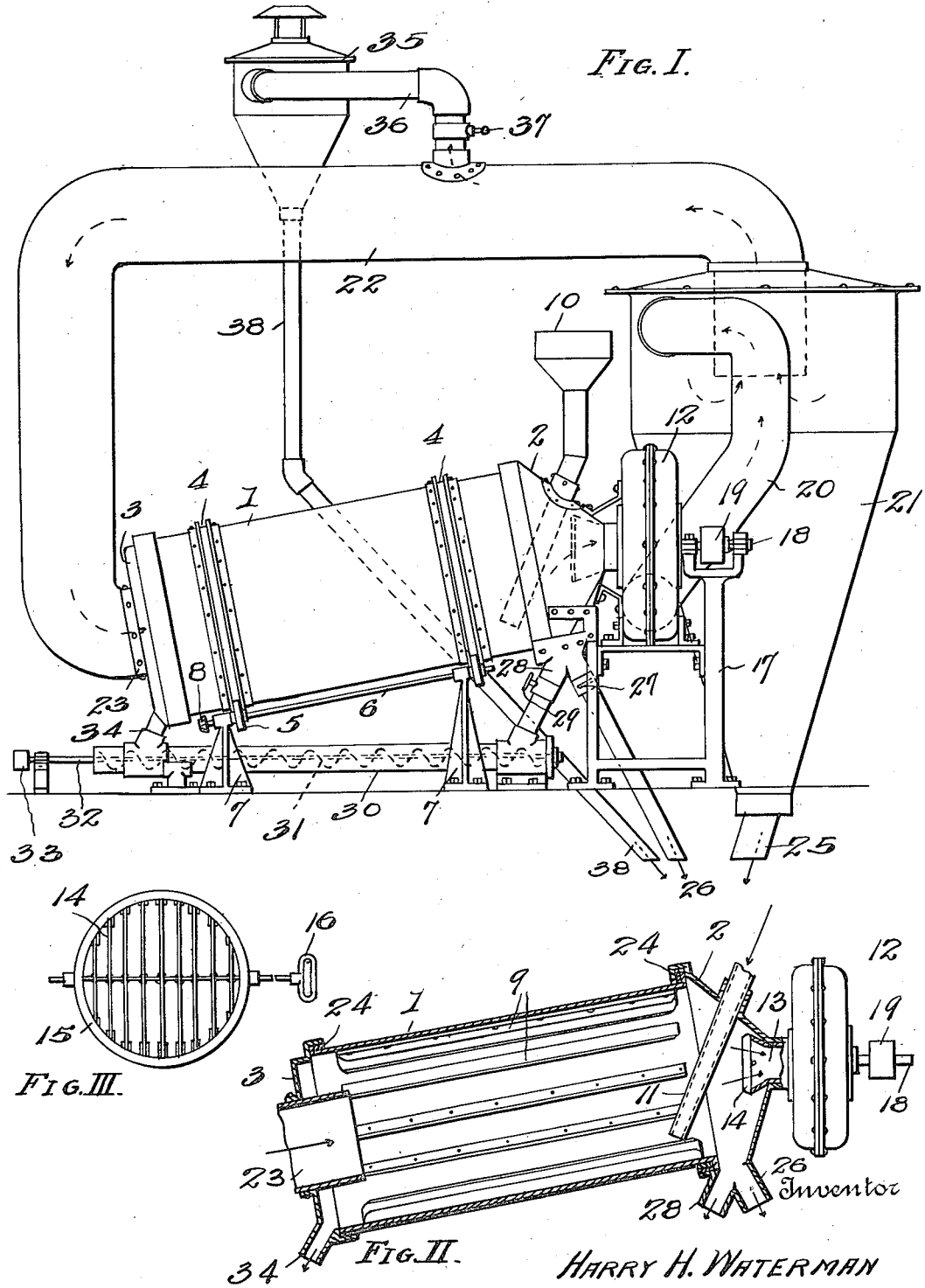

1,518,031

UNITED STATES PATENT OFFICE.

HARRY H. WATERMAN, OF STRASBURG JUNCTION, VIRGINIA.

PNEUMATIC SEPARATOR.

Application filed July 25, 1922. Serial No. 577,371.

*To all whom it may concern:*

Be it known that I, HARRY H. WATERMAN, a citizen of the United States, residing at Strasburg Junction, in the county of Shenandoah and State of Virginia, have invented certain new and useful Improvements in Pneumatic Separators, of which the following is a specification.

The subject matter of the present invention involves certain improvements in the construction of the pneumatic separator disclosed in my application for patent filed September 20, 1921, Ser. No. 501,914, wherein means are provided for separating hydrated lime, after it has been received from the hydrator, and for storing or collecting the finely divided lime after separation. In the present improved structure, the same satisfactory results are attained as in the original application, but I have combined and arranged the parts of the separating apparatus in such manner as to dispense with some of the elements formerly utilized, and as a result the present apparatus is more compact, occupies less space for its installation, requires less expenditure of power in its operation, and is comparatively less expensive in both construction and operation.

While I shall hereinafter refer specifically to lime as the material treated, it will be understood that the invention is equally well adapted for separation of lighter or finer materials from phosphate rock, roofing slag, grains, lime stone screenings, and other comminuted materials wherein it is desired to separate the dust or finer particles from the coarser materials. The apparatus of the present invention is particularly well adapted for producing lime as used under the titles of commercial lime and agricultural lime, and the apparatus may be adjusted and operated for the purpose of separating and recovering various grades of comminuted lime, as will hereinafter be set forth.

In connection with the apparatus I utilize a continuous circulation of air for holding in suspension and separating the comminuted material, and construct the blower for creating and maintaining this circulation in close and compact relation with the operating parts of the separator.

In the accompanying drawings I have illustrated one combination and arrangement of the parts utilized in carrying out the principles of my invention.

Figure 1 is a view in side elevation, showing the complete installation of the pneumatic separator and connections.

Figure 2 is a longitudinal, vertical, sectional view through the drum and its connections, showing also the fan-blower.

Figure 3 is a face view of the adjustable intake device used in connection with the blower.

I utilize a rotary, inclined drum or reel 1, of usual type for the purpose, which is provided at its ends with a fixed funnel-head 2 and a fixed hood 3, the former at the upper or elevated end of the drum and the latter at the lower end of the drum.

The rotary drum is provided with customary annular tracks 4 on its exterior, spaced apart, and the drum is supported on rollers 5 which co-act with the annular tracks in guiding the drum in its rotation. The rollers are properly spaced at the sides of the drum and fixed on shafts 6 which extend parallel with the longitudinal axis of the drum. Bearing brackets 7 are provided, and the shafts, or one of them may be driven from a gear wheel as 8 by suitable driving connections, in well known manner.

Within the interior of the drum are fixed longitudinally extending blades 9 of angle irons, or other shapes for agitating and suspending the lime as it is fed to the drum from the feed hopper 10 and supply spout 11. The spout 11 as shown is projected through the funnel-shaped head 2 of the drum and the lower end of the spout is arranged to direct the incoming material to the lower portion of the charging end of the drum as seen in Figure 2.

For creating and maintaining a continuous circulation of air through the apparatus I utilize a fan blower 12 which may be of any standard or suitable type, having its intake pipe 13 centrally connected therewith and projected into the head 2 of the drum. For controlling the admission of air through the intake pipe, I utilize a series of connected and pivoted blades 14, supported in the circular frame 15, and by means of the handle 16 located at the exterior of the head the position of these blades may be regulated to govern the area of the opening to the intake pipe 13 of the fan blower, in manner well understood.

Suitable framework 17 is provided for the support of the fan blower and the fixed or stationary connections between the fan blower and drum, and the fan shaft 18 journaled in the frame is revolved by belt power applied to the pulley 19.

The discharge pipe 20 from the fan extends horizontally from the bottom thereof and has a tangential connection at the upper end of the dust collector 21, from whence the supply pipe 22 leads to the rotary drum with an inlet open end 23 within the drum. The passage of air currents is indicated by arrows in the drawing, it being apparent that the blast from the fan blower passes through the dust collector, the supply pipe, and thence through the rotary drum to the intake pipe of the fan blower thus creating and maintaining a continuous circulation of air through the apparatus.

Preferably the joint between the drum and its two fixed ends, as the funnel head 2 and hood 3, is closed by a gasket or packing ring 24, the ends of the drum, the funnel head and the hood being flanged to permit these closed joints, and allow freedom for rotation of the drum with relation to its fixed end closures.

The comminuted lime after being fed to the drum is agitated by the lifting action of the longitudinal blades or ribs in the interior of the drum, and the material thus suspended throughout the length of the drum. The finest grade or smallest particles in the form of dust, is passed from the right end of the drum and funnel-head through the fan-blower to the dust collector 21, and by action of the collector the dust is passed through the outlet spout 25 at the lower end of the collector, to the receiving bin or other receptacle.

The minor portion of the finely comminuted lime, separated by the current of air from the inlet pipe 23, while in suspension in the drum, is passed to the funnel-head 2, settling in the bottom thereof, and thence passing down through the main outlet or discharge spout 26 to the receiving bin, from where it may be gathered and shipped for masonry and similar uses. A pivoted valve or similar control device indicated at 27 may be interposed in the chute 26 for controlling or cutting off the passage of fine hydrate lime through this chute.

For agricultural purposes a coarser grade of lime is utilized than for masonry work, and this coarser grade of lime is, or may be enhanced by the addition of some of the finer quality of lime. Thus by closing the valve 27, the separated lime may be permitted to pass through an outlet chute 28 from the funnel head, which chute is controlled by a pivoted or hinged valve 29 therein. The chute 28 communicates with a cylindrical casing 30 located beneath the drum and the lime delivered to this casing is passed therethrough by means of the screw conveyer indicated at 31, by dotted lines. The screw conveyer has a shaft indicated at 32, which is revolved from power applied to the pulley or wheel 33 on the shaft, and the material is conveyed from right to left in Figure 1 of the drawings.

This conveyer casing also receives the coarsest and heaviest particles of lime that fall to the bottom of the agitating drum and are not blown by the air currents, directed through the axial center of the drum, to the funnel-head. As the drum continues to revolve or rotate these coarser particles gravitate toward the left, lower end of the drum and finally pass out through the discharge nozzle 34 which opens to the interior of the drum through the hood 34. Thus the product comprising both the finer quality of lime, or a portion of the output of finer lime, together with the entire product of coarse lime may be gathered and conveyed through the instrumentality of the screw conveyer casing to a receiving bin for use as agricultural lime.

As an auxiliary agency for removing dust from the supply or blast pipe 22 that may have passed through the collector 21, I use a smaller collector 35, connected to the main pipe 22 by a branch pipe 36, and provided with a damper or valve 37. With the valve 37 open air currents may be admitted through the pipe 36, the dust reclaimed in the collector 35, and conveyed by the chute 38 to the receiving bin. This valve 37 may also be utilized to regulate the air circulation throughout the system, as is also the series of shutters or blades 14 available for admitting the air currents through the intake side of the blower fan.

It will be noted that the drum has an unobstructed interior whereby the agitator or drum is swept by indirect exhaust of the fan passing therethrough and carrying the fines direct to the intake of the blower.

It will also be noted that the areas and capacity of the supply pipe 22 and of the drum are materially greater than that of the discharge pipe 20 of the blower, thus providing means for decreasing the velocity of air currents between the collector and the agitator to insure expansion of air whereby dust-laden air may be fully consumed by the intake of the blower. This expansion of air is also enhanced when the valve 37 is opened for use of the auxiliary collector 35.

Having thus fully described my invention, what I claim as new and desire to secure by Letters Patent is:—

1. In a separator, the combination with an agitator having an air swept, unobstructed interior, of a fixed head closing one end of the agitator, a fan blower having its intake connected with said head, a dust collector connected with the discharge end of the blower, a supply device, a fixed hood closing the other end of the agitator and having an outlet for coarse material, and an air supply pipe connecting said collector and hood.

2. In a separator the combination with a rotary drum having an air-swept unobstructed interior, of a fixed head closing one end of said drum, a fan blower having its intake connected with said head, a dust collector connected with the discharge end of the blower, a supply device extending through said head, a fixed hood closing the other end of the drum and having an outlet for coarse material, and an air supply pipe from said collector to said hood.

3. In a separator the combination with a rotary agitating drum, of a fixed hood and fixed funnel-head closing the ends of said drum, a feed supply pipe to said drum through said head, a fan blower having its intake end connected directly to said head and means for controlling the opening through said intake end, a discharge pipe from the blower, a dust collector at the end of the discharge pipe, and an air supply pipe connecting said collector with said hood.

4. In a lime separator the combination with a rotary drum, a fixed hood and a fixed funnel-head closing the ends of said drum and means for supplying material to said drum through said head, of a blower having its intake end connected with said head, a dust collector and a discharge pipe connecting said blower and collector, a supply pipe connecting said collector and said hood, a discharge chute for fine lime from the head and a discharge chute for coarser lime from the hood.

5. In a pneumatic separator comprising means for creating and maintaining a continuous circulation of air including a rotary drum, of a discharge device for fine material at one end of the drum, a conveyer, a discharge pipe for coarser material from the other end of said drum to said conveyer, a pair of pipes connected to said device one of which is connected to said conveyer, and means for regulating the passage of fine material through the latter pipe.

6. In a separator the combination with a rotary drum having an air-swept unobstructed interior, of a fixed head closing one end of said drum, a fan blower having its intake connected with said head, a dust collector connected with the discharge end of the blower, a supply device extending through said head, a fixed hood closing the other end of said drum and having an outlet for coarse material, an air supply pipe from said collector to said hood, an auxiliary dust collector having a branch pipe connected to said air supply pipe, and a dust outlet from said auxiliary dust collector.

7. In a separator the combination with an agitator having an air-swept unobstructed interior, of a fixed head closing one end of the agitator and a fixed hood closing the other end thereof, a supply device for the agitator, a fan blower having its intake connected with said head, a dust collector connected with the discharge end of the blower, an air supply pipe connecting said collector and hood, said agitator and air pipe being of such dimensions relative to the discharge end of the blower as to insure expansion of air whereby dust-laden air may be fully consumed by the intake of the blower.

8. In a separator the combination with an agitator having an air-swept unobstructed interior, of a fixed head closing one end of the agitator and a fixed hood closing the other end thereof, a supply device for the agitator, a fan blower having its intake connected with said head, a dust collector connected with the discharge from the blower, an air supply pipe connecting said collector and hood, and means in connection with the air pipe for decreasing the velocity of air currents between the collector and the agitator.

HARRY H. WATERMAN.